United States Patent
Gavalas et al.

(10) Patent No.: US 10,666,708 B1
(45) Date of Patent: May 26, 2020

(54) SYSTEMS AND METHODS FOR UPDATING WEB PAGES USING STATIC RESOURCE VERSION PINNING

(71) Applicant: Facebook, Inc., Menlo Park, CA (US)

(72) Inventors: Nicholas John Gavalas, Franklin Square, NY (US); Nathan Paul Schloss, New York, NY (US); Pieter David Vanderwerff, Mountain View, CA (US); Andrey Sukhachev, Sunnyvale, CA (US); Benjamin D. Maurer, Palo Alto, CA (US); Bhuwan Bhushan Khattar, Mountain View, CA (US); Killian Murphy, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 80 days.

(21) Appl. No.: 15/901,887

(22) Filed: Feb. 21, 2018

(51) Int. Cl.
*G06F 15/16* (2006.01)
*H04L 29/08* (2006.01)

(52) U.S. Cl.
CPC ............ *H04L 67/06* (2013.01); *H04L 67/146* (2013.01); *H04L 67/2842* (2013.01); *H04L 67/1097* (2013.01)

(58) Field of Classification Search
CPC ............ G06F 11/0709; G06F 11/0742; G06F 11/0748; G06F 11/0775; H04L 67/02
See application file for complete search history.

(56) References Cited

U.S. PATENT DOCUMENTS

| | | | |
|---|---|---|---|
| 8,631,394 B2 | 1/2014 | Klots | |
| 2007/0027887 A1* | 2/2007 | Baldwin | G06F 17/279 |
| 2007/0244920 A1* | 10/2007 | Palliyil | G06F 16/9014 |
| 2012/0324449 A1* | 12/2012 | Huetter | G06F 9/5066 |
| | | | 718/1 |
| 2013/0262389 A1* | 10/2013 | Rathof | G06F 11/1464 |
| | | | 707/642 |
| 2015/0347512 A1* | 12/2015 | Luo | G06F 16/2455 |
| | | | 707/720 |
| 2016/0127440 A1* | 5/2016 | Gordon | H04N 21/23439 |
| | | | 709/219 |
| 2019/0069004 A1* | 2/2019 | Badawiyeh | H04N 21/234345 |

* cited by examiner

*Primary Examiner* — Brian Whipple
*Assistant Examiner* — Gregory P Tolchinsky
(74) *Attorney, Agent, or Firm* — Sheppard Mullin Richter & Hampton LLP

(57) ABSTRACT

Systems, methods, and non-transitory computer-readable media can receive a client request from a requesting user. The client request is associated with a web page. A static resource file identifier and a version identifier are determined based on the client request. A response to the client request is generated based on the static resource file identifier and the version identifier.

19 Claims, 9 Drawing Sheets

250

500

Receive at a computing device a client request from a requesting user, the client request being associated with a web page
502

Determine a static resource file identifier and a version identifier based on the client request
504

Generate a response to the client request based on the static resource file identifier and the version identifier
506

Receive at a computing device a client request from a requesting user, wherein the client request is associated with a static resource file identifier, a version identifier, and a set of user parameters associated with the requesting user
552

Identify a set of tree hashes associated with the static resource file identifier and the version identifier
554

Identify a set of tree graphs associated with the set of tree hashes
556

Store the set of tree graphs in a local cache of the computing device, wherein at least one of the tree graphs of the set of tree graphs is retrieved from a remote database and copied to the local cache
558

FIGURE 5B

SYSTEMS AND METHODS FOR UPDATING WEB PAGES USING STATIC RESOURCE VERSION PINNING

FIELD OF THE INVENTION

The present technology relates to the field of web pages. More particularly, the present technology relates to systems and methods for safely implementing web page updates.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system. In certain scenarios, a user can access the social networking system by using a computing device to load a web page (or web site).

SUMMARY

Various embodiments of the present disclosure can include systems, methods, and non-transitory computer readable media configured to receive a client request from a requesting user. The client request is associated with a web page. A static resource file identifier and a version identifier are determined based on the client request. A response to the client request is generated based on the static resource file identifier and the version identifier.

In an embodiment, the static resource file identifier and the version identifier identify a first static resource file version. One or more additional static resource file versions are identified. The first static resource file version depends upon the one or more additional static resource file versions.

In an embodiment, the identifying the one or more additional static resource file versions comprises querying an auxiliary data table. The auxiliary data table comprises a plurality of entries, each entry of the plurality of entries is associated with a particular static resource file version, and each entry of the plurality of entries, being associated with a particular static resource file version, identifies a set of additional static resource file versions upon which the particular static resource file version depends.

In an embodiment, each static resource file version of the set of additional static resource file versions is identified in the auxiliary table by a tree hash associated with the static resource file version.

In an embodiment, the auxiliary data table de-duplicates data that is common to multiple revisions of a static resource file.

In an embodiment, a set of tree graphs associated with the first static resource file version and the one or more additional static resource file versions is identified.

In an embodiment, the set of tree graphs are stored in a local cache of the computing system. At least one of the tree graphs of the set of tree graphs is retrieved from a remote database and copied to the local cache.

In an embodiment, the remote database stores a set of tree data defining a plurality of tree graphs, and the local cache stores a subset of the set of tree data.

In an embodiment, each tree graph of the set of tree graphs is traversed based on a set of user parameters associated with the requesting user to identify a set of user-adapted static resource files.

In an embodiment, the response to the client request comprises a set of URLs, and each URL of the set of URLs specifies a network address from which a user-adapted static resource file of the set of user-adapted static resource files can be downloaded.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5A illustrates an example method associated with processing a client request, according to an embodiment of the present disclosure.

FIG. 5B illustrates an example method associated with processing a client request, according to an embodiment of the present disclosure.

Figure 1:
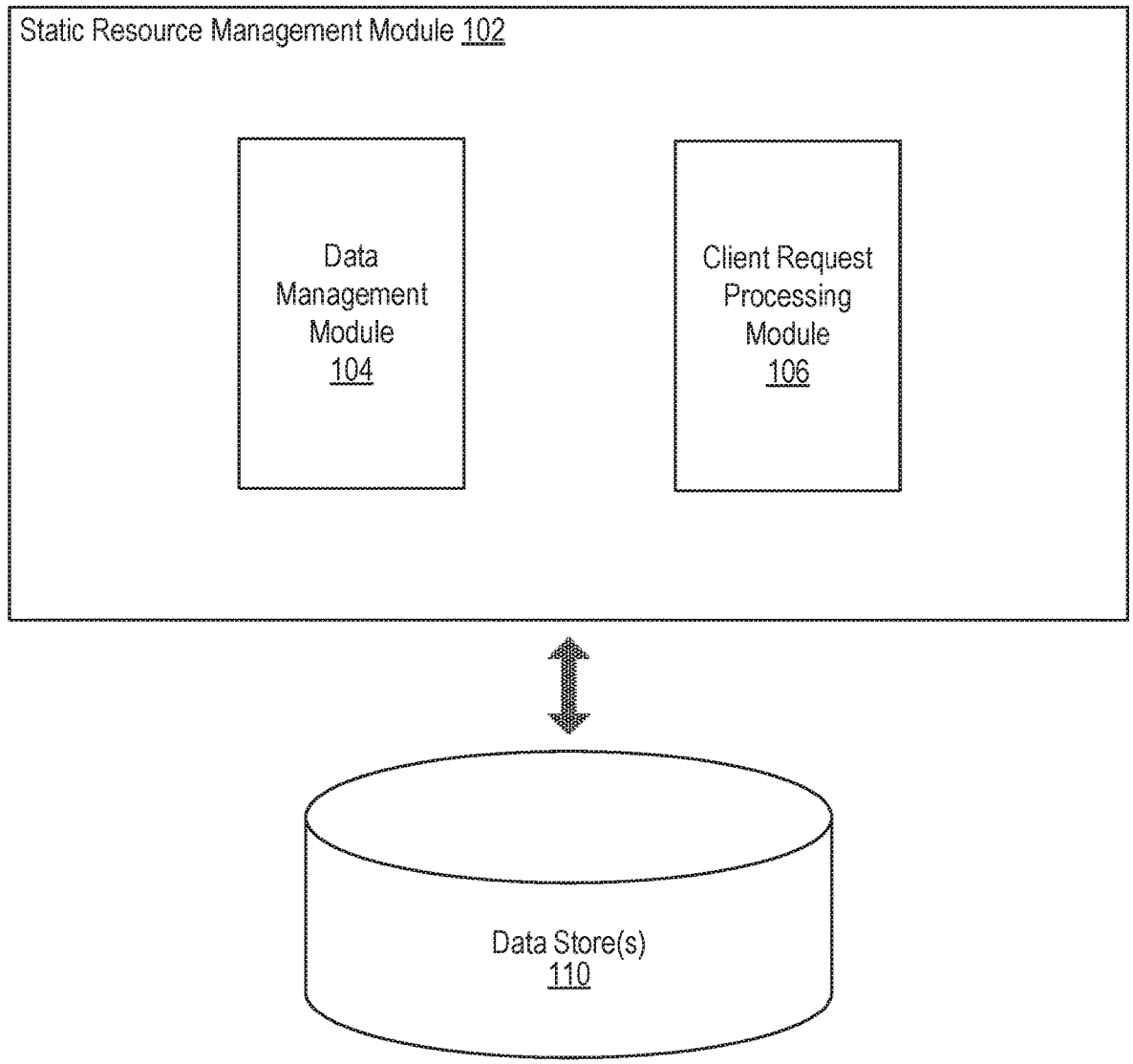
FIG. 1 illustrates an example system including a static resource management module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Static Resource Version Pinning

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system. In certain scenarios, a user can access the social networking system by using a computing device to load a web page (or web site).

When a user attempts to access a web page, such as a web page on a social networking system, a client computing device used by the user can transmit a request for the web page. For example, a user can use a web browser application on the client computing device to try to access and view a web page, and the client computing device can transmit a corresponding request for the web page. The request can be received at one or more web servers associated with the web page. The one or more web servers can communicate with the client computing device to transmit appropriate resources to the client computing device so that the web browser application can load the web page. There are generally two types of resources that may be included in a web page: static resources and dynamic resources. In general, dynamic resources may change (i.e., may be updated) more frequently, whereas static resources tend to remain more stable and unchanged for longer periods of time. Examples of static resources may include, but are not limited to, JavaScript code for generating dynamic web pages, Cascading Style Sheets (CSS) code for describing the presentation semantics of a web page, and images (e.g., GIF or JPEG files) included in web pages. Static resources may be contained in static resource files, such as JavaScript files, CSS files, and/or image files. Static resources that are intended to be transmitted to and/or executed on a client computing device may also be referred to herein as client-side static resources.

When a web page provider, such as a social networking system, wants to update a web page, the web page provider will generally update server-side code residing on one or more web servers. Similarly, client-side static resources can also be updated so that they are compatible with the updated server-side code. However, web page providers may have a very large number of web servers, with some larger providers having hundreds or thousands of web servers. For each new update, updated server-side code must be pushed to each of these web servers. It can be appreciated that this update push process can involve significant amounts of time, sometimes on the order of hours or even days. This can cause a situation in which, during the update push, certain web servers have updated server-side code while others have non-updated server-side code. Similarly, under conventional approaches, during the update push period, certain client computing devices may have non-updated client-side static resources while other client computing devices may have updated client-side static resources.

In such scenarios, non-updated client-side static resources may attempt to communicate with updated server-side code and/or updated client-side static resources may attempt to communicate with non-updated server-side code. In other words, there may be a version mismatch between client-side static resources and server-side code. Under conventional approaches, this can be problematic, as changes in either the updated client-side static resources and/or the updated server-side code may make them incompatible with non-updated server-side code and/or non-updated client-side static resources. These errors in communication caused by version mismatches are generally temporary because, eventually, all client computing devices and web servers should become updated with the latest update versions. However, during update push periods, communication errors caused by version mismatches can cause potentially serious problems. These problems can be particularly troublesome for web pages that are updated frequently, resulting in frequent update push periods with increased potential for version mismatches. Furthermore, under conventional approaches, data storage restrictions for web servers generally make it impractical for a web server to service multiple versions of client-side static resources at a given time. Therefore, under conventional approaches, web servers are generally configured to service only a single version (e.g., a most recent version) of client-side static resources.

An improved approach rooted in computer technology overcomes the foregoing and other disadvantages associated with conventional approaches specifically arising in the realm of computer technology. In general, when a user (e.g., a web page provider) attempts to update a web page to a new update version, the update can be pushed out to one or more web servers associated with the web page. However, rather than forcing client-side static resources to also be updated to the latest update version, client-side static resources can be kept at an earlier version. In other words, even while server-side code is being updated to a new version, client-side static resources can, at least temporarily, remain "pinned" to an earlier version. In order for updated web servers to communicate with and/or service client-side static resources from previous versions, data can be stored on the web servers in such a way that the web servers are configured to be backwards-compatible and capable of servicing (e.g., providing) client-side static resources from earlier versions.

As mentioned above, under conventional approaches, limitations on web server data storage generally make it impractical for a web server to service previous versions of client-side static resources. Various embodiments of the present disclosure allow for backwards-compatibility of web servers while substantially minimizing the amount of data that is stored locally at each web server. In certain embodiments, a layered or tiered caching system may be implemented. For example, the tiered caching system may comprise a primary storage layer (e.g., a mySQL layer), an intermediate cache layer (e.g., a Memcache layer), and a local cache layer (e.g., an Alternative PHP Cache, or APC, layer). The primary storage layer can comprise one or more primary storage databases. The intermediate cache layer can comprise one or more intermediate cache data stores. The local cache layer can comprise local cache memory on one or more web servers. For example, if a web page is associated with a set of web servers that execute server-side code (e.g., PHP code), the local cache layer can comprise cache memory installed on the set of web servers. In general, accessing data stored in the primary storage layer may require more time than accessing data stored in the intermediate cache layer, which may require more time than accessing data stored in the local cache layer.

In various embodiments, the primary storage layer can store tree graphs for a plurality of static resource files and their various versions. As mentioned above, each static resource file may have multiple versions. For example, a first version of a static resource file can correspond to a first version of a website and can be referred to as "version 1," while a fifth version of the static resource file that corresponds to a fifth version of the website may be referred to as "version 5." Within the present disclosure, a particular version of a particular static resource file may be referred to as a "static resource file version."

Furthermore, each version of a static resource file (i.e., each static resource file version) may itself have a plurality of user-adapted versions. Different user-adapted versions of a static resource file may be substantially identical in content, but may adapt that content for different users. For example, consider a static resource file that is configured to present the word "PERSON" in a user's browser. A first user-adapted version of that static resource file may be adapted for an English-speaking user, while a second user-adapted version of that static resource file may be adapted for a French-speaking user. In this example scenario, the English-speaking user-adapted version of the static resource file may present the word "PERSON" in the user's browser, while the French-speaking user-adapted static resource file would present the word "PERSONNE." The various user-adapted versions of a static resource file may be stored as separate files. As such, a particular static resource file version may have a plurality of user-adapted static resource files. The tree graph for a particular static resource file version can be used to identify an appropriate user-adapted static resource file based on user parameters associated with a requesting user. A hashing algorithm can be applied to each tree graph to generate a unique tree hash for each tree graph.

The data for a plurality of tree graphs for a plurality of versions of a plurality of static resource files can require substantial amounts of memory. As such, in various embodiments, a set of tree graph data defining a set of tree graphs for a plurality of static resource file versions can be stored in the primary storage layer, while a subset of the tree graph data can be stored in the local cache layer. In certain embodiments, a second subset of the tree graph data can be stored in the intermediate cache layer. The local cache layer can store tree hashes for each tree graph in the set of tree graphs such that the local cache layer can retrieve tree graphs from the primary storage layer and/or the intermediate cache layer as needed. As user requests associated with various static resource file versions are received, the appropriate tree graphs can be retrieved from the primary storage layer and/or the intermediate cache layer and cached into the intermediate cache layer and/or the local cache layer. In this way, web servers store tree hash information, which is relatively small in size, and the web servers are still able to access tree graph data for every version of every static resource file without having to locally store that data. In this way, web servers are made "backwards-compatible" and able to service any version of any static resource file. These features and others are described in greater detail herein.

FIG. 1 illustrates an example system 100 including a static resource management module 102, according to an embodiment of the present disclosure. The static resource management module 102 can be configured to maintain a tiered caching system comprising a primary storage layer and a local cache layer. The tiered caching system can, in various embodiments, also comprise an intermediate cache layer. For example, the primary storage layer may be a mySQL layer, the intermediate cache layer can be a Memcache layer, and the local cache layer can be an APC layer. In various embodiments, data stored in the local cache layer can generally be accessed more quickly by a web server than data stored in the intermediate cache layer, and data stored in the intermediate cache layer can generally be accessed more quickly by a web server than data stored in the primary storage layer. The static resource management module 102 can generate and/or maintain a set of tree graph data defining a plurality of tree graphs. In certain embodiments, the static resource management module 102 can store the set of tree graph data in the primary storage layer. Each tree graph of the set of tree graphs can be associated with a particular version of a particular static resource file. For example, if a first static resource file has been updated three times, then the first static resource file has four versions, and each of those four versions can be associated with a unique tree graph. Similarly, if a second static resource file has been updated once, then each of the two versions of the second static resource file can be associated with a unique tree graph. Each version of a static resource file (i.e., each static resource file version) can have a plurality of user-adapted versions. Each user-adapted version of a static resource file version can be stored as an individual file, also referred to as a user-adapted static resource file. The tree graph for a particular static resource file version can be used to identify an appropriate user-adapted static resource file based on user characteristics of a requesting user. In various embodiments, the static resource management module 102 can generate and/or maintain a unique file hash for each user-adapted static resource file. In various embodiments, the static resource management module 102 can also generate and/or maintain a unique tree hash for each tree graph.

The static resource management module 102 can generate and maintain an auxiliary data table in the local cache layer. The auxiliary data table can include a plurality of entries, and each entry can be associated with a particular version of a particular static resource file. For example, a first entry may be associated with a first version (i.e., "version 1") of a first static resource file resource.js; a second entry may be associated with version 5 of the first static resource file resource.js; a third entry may be associated with version 1 of a second static resource file template.js, and so forth. Each entry can also be associated with a set of tree hashes. The set of tree hashes for a particular entry may define a set of static resource file versions that are required in order to execute the static resource file version associated with that entry.

The static resource management module 102 can be configured to receive and process web page requests from a client computing device. In various embodiments, a web page request may identify a web page being requested by the user. The web page being requested by the user may be associated with one or more static resource files. Furthermore, information provided within the web page request may be used to identify an appropriate version of each static resource file needed to respond to the request. As such, based on the web page request, a static resource file version can be determined. For example, the web page request may be associated with a static resource file identifier (e.g., a filename) and a version identifier (e.g., a version number). The static resource management module 102 can query the auxiliary data table to identify a set of tree hashes associated with the static resource file version. The static resource management module 102 can retrieve a set of tree graphs based on the set of tree hashes. The static resource management module 102 can identify a particular user-adapted static resource file and a corresponding file hash from each tree graph of the set of tree graphs based on user parameters associated with the requesting user. The static resource management module 102 can generate a response to the web page request based on the set of file hashes identified, and transmit the response to the requesting user.

As shown in the example of FIG. 1, the static resource management module 102 can include a data management module 104 and a client request processing module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the static resource management module 102 can be implemented in any suitable combinations.

In some embodiments, the static resource management module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the static resource management module 102 can be, in part or in whole, implemented as software running on one or more computing devices or systems, such as on a server system or a client computing device. In some instances, the static resource management module 102 can be, in part or in whole, implemented within or configured to operate in conjunction with or be integrated with a social networking system (or service), such as a social networking system 630 of FIG. 6. Likewise, in some instances, the static resource management module 102 can be, in part or in whole, implemented within or configured to operate in conjunction with or be integrated with a client computing device, such as the user device 610 of FIG. 6. For example, the static resource management module 102 can be implemented as or within a dedicated application (e.g., app), a program, or an applet running on a user computing device or client computing system. The application incorporating or implementing instructions for performing functionality of the static resource management module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The static resource management module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the static resource management module 102. For example, the data store 110 can store tree graph data for a set of tree graphs, one or more auxiliary data tables, file hashes for a plurality of user-adapted static resource files, tree hashes for a plurality of tree graphs, and the like. It is contemplated that there can be many variations or other possibilities.

The data management module 104 can be configured to maintain a tiered caching system comprising a primary storage layer and a local cache layer. In certain embodiments, the local cache layer can comprise local caches on one or more web servers, and the primary storage layer can comprise one or more remote databases that are accessible by the one or more web servers. In various embodiments, the tiered caching system can also comprise an intermediate cache layer between the primary storage layer and the local cache layer. For example, the primary storage layer may be a mySQL layer, the intermediate cache layer can be a Memcache layer, and the local cache layer can be an APC layer.

The data management module 104 can generate and/or maintain a set of tree graph data defining a plurality of tree graphs for a plurality of static resource files of a plurality of different versions. In various embodiments, the set of tree graph data can be stored in the primary storage layer, while a subset of the tree graph data can be stored in the intermediate cache layer and/or the local cache layer. By storing the set of tree graph data in the primary storage layer, tree graph data for a plurality of static resource file versions can be maintained without running afoul of storage constraints in the local cache layer.

Furthermore, in order to increase the efficiency of retrieving tree graph data, the data management module 104 can maintain an auxiliary data table in the local cache layer. For example, each web server of a set of web servers can locally store a copy of the auxiliary data table. The auxiliary data table can comprise a plurality of entries, with each entry being associated with a version identifier and a static resource file identifier. A version identifier (e.g., a version number) and a static resource file identifier (e.g., a filename) can identify a particular version of a particular static resource file (i.e., a particular static resource file version). Each entry in the auxiliary data table can comprise a set of tree hashes. The set of tree hashes for a particular entry can identify all tree hashes required to execute the particular static resource file version associated with the entry. The data management module 104 is described in greater detail herein with reference to FIG. 2A.

The client request processing module 106 can be configured to process and generate a response to a web page request from a requesting user. The web page request can comprise information sufficient to determine a static resource file identifier and a version identifier. For example, the web page request may identify a web page and may include version information. The version information can, for example, identify a version of JavaScript running on a client computing device, identify a version of static resource files resident on a client computing device, identify a version of the web page being requested, or include any other information such that, in conjunction with the identified web page, the client request processing module 106 can identify a static resource file identifier and a version identifier associated with the web page request. The client request processing module 106 can query an auxiliary data table to identify an entry that corresponds to the static resource file identifier and the version identifier. The client request processing module 106 can retrieve a set of tree hashes associated with the identified entry. The client request processing module 106 can retrieve a set of tree graphs based on the set of tree hashes. The client request processing module 106 can identify a set of file hashes based on the set of tree graphs and user parameters associated with the requesting user. For example, for each tree graph of the set of tree graphs, the client request processing module 106 can identify a file hash based on the user parameters. The client request processing module 106 can generate and transmit a response to the web page request based on the set of file hashes. The client request processing module 106 is described in greater detail herein with reference to FIG. 3.

Figure 2A:
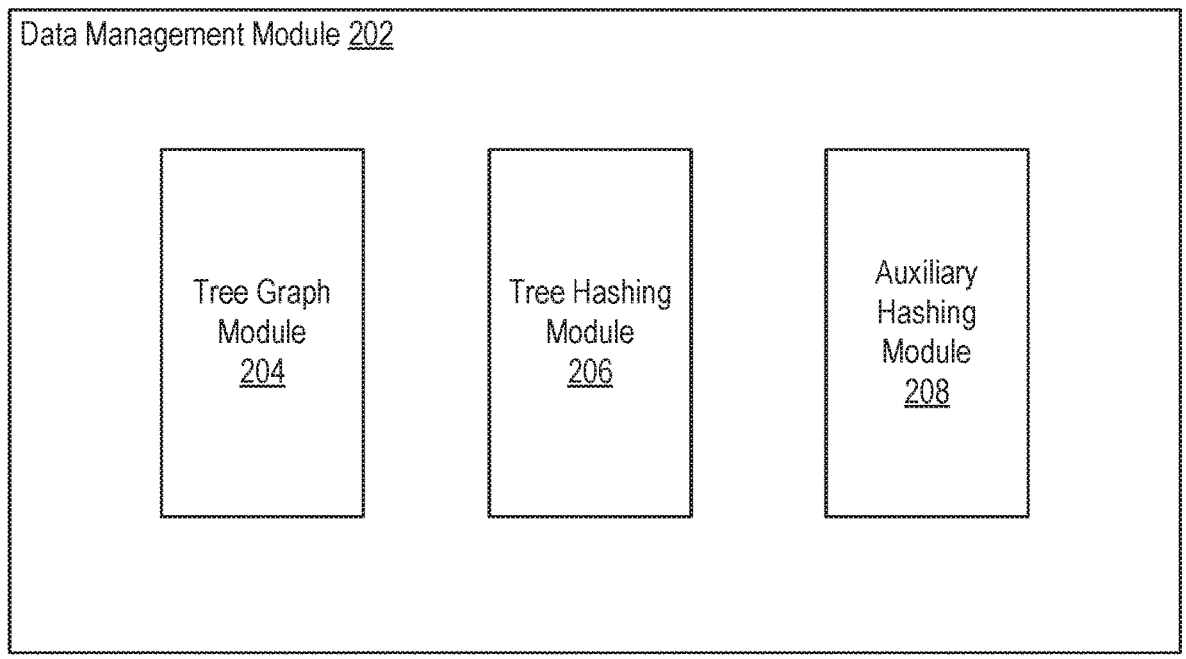
FIG. 2A illustrates an example data management module, according to an embodiment of the present disclosure.

FIG. 2A illustrates an example data management module 202 configured to maintain a set of static resource data in a tiered caching system, according to an embodiment of the present disclosure. In some embodiments, the data management module 104 of FIG. 1 can be implemented as the data management module 202. As shown in the example of FIG. 2A, the data management module 202 can include a tree graph module 204, a tree hashing module 206, and an auxiliary hashing module 208.

The tree graph module 204 can be configured to generate and/or maintain a set of tree graph data which defines a set of tree graphs. As discussed above, a web page can comprise a plurality of static resource files. Further, as new versions and/or updates of the web page are released, certain static resource files may be updated, creating new versions of those static resource files. For example, consider an example scenario in which a web page is initially released with three static resource files: alpha.js, bravo.js, and charlie.js. The initial version of the web page can be referred to as "version 1" of the web page, and the initial versions of those static resource files may be referred to as alpha.js version 1, bravo.js version 1, and charlie.js version 1. After some time, the web page may be updated, and the update may comprise an update to static resource file alpha.js. The updated web page may be referred to as version 2 of the web page, and the new, updated version of alpha.js may be referred to as alpha.js version 2.

Furthermore, each version of a static resource file may itself have a plurality of user-adapted versions. User-adapted versions of a static resource file version may be a version of the static resource file version that is tailored to a particular user based on various user parameters. For example, the user parameters can include language, such that a first user-adapted version of a static resource file version may be for users in English-speaking countries, and a second user-adapted version of the static resource file version may be for users in French-speaking countries. In another example, the user parameters can include display resolution, such that a first user-adapted version is for users with displays capable of displaying a first resolution (e.g., a low resolution), a second user-adapted version is for users with displays capable of displaying a second resolution (e.g., a middle resolution), and a third user-adapted version is for users with displays capable of displaying a third resolution (e.g., a high resolution). Other examples of user parameters can include which browser application a user is using, a user's location, whether the user's browser utilizes a left to right (LTR) orientation or a right to left (RTL) orientation, a resolution of the user's display, a pixel ratio of the user's display, a font size setting for the user, and the like. In certain embodiments, each user-adapted version of a static resource file version can be stored in an individual file, also referred to as a user-adapted static resource file.

Each user-adapted version can be associated with a plurality of user parameters. For example, a first user-adapted version of a static resource file version may be for English-speaking users, using a high resolution display, with a font size of 12. A second user-adapted version of the same static resource file version may be for French-speaking users, using a low resolution display, with a font size of 14. It can be appreciated that with combinations of even just a few user parameters, each static resource file version can have hundreds or even thousands of user-adapted versions. The tree graph module 204 can generate and/or maintain a tree graph for each version of each static resource file. The tree graph can be used to organize the multitude of user-adapted versions for each static resource file version, and to efficiently identify the correct user-adapted static resource file(s) for a particular user. Example embodiments for generating and maintaining tree graphs for static resource files are disclosed in U.S. Pat. No. 8,631,394, entitled "STATIC RESOURCE PROCESSING," and issued on Jan. 14, 2014, the entire contents of which are hereby incorporated by reference as if fully set forth herein. The tree graph module 204 can generate a unique file hash for each user-adapted static resource file. As such, each file hash can uniquely identify a particular user-adapted version of a particular version of a particular static resource file (e.g., alpha.js, version 3, for English-speaking users, with high resolution displays, using the Internet Explorer web browser, and font size 10.)

Figure 2B:
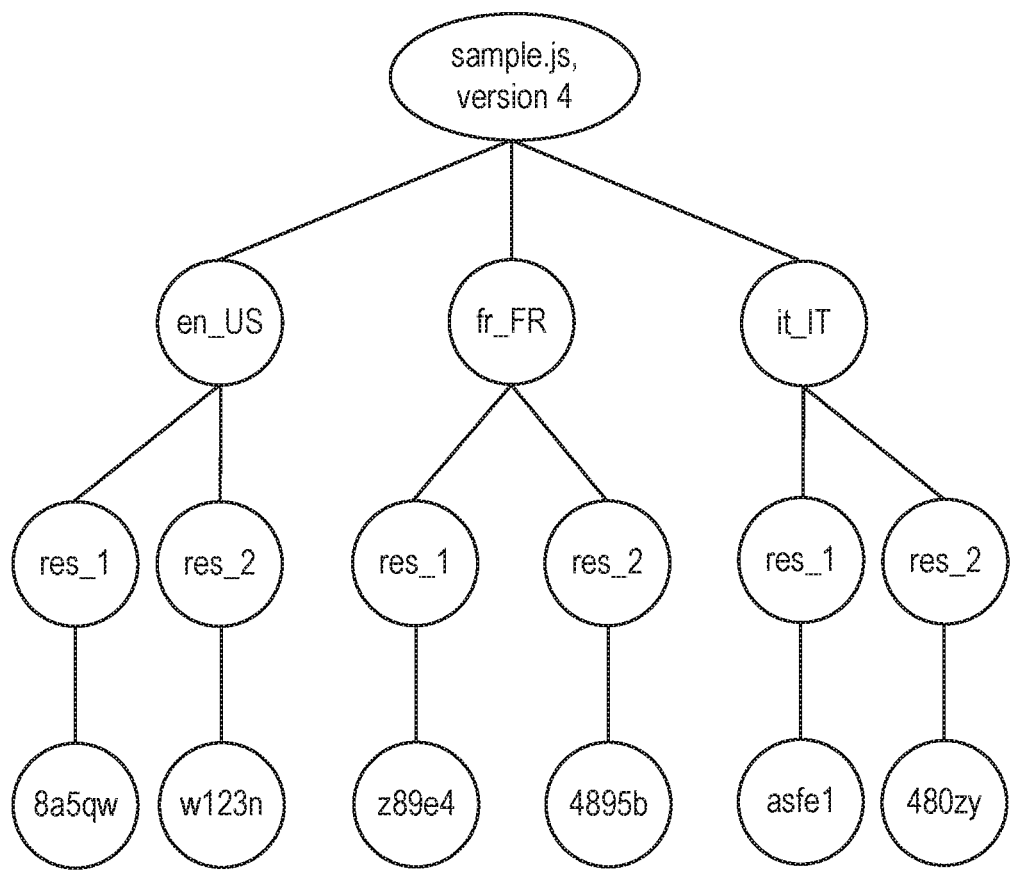
FIG. 2B illustrates an example tree graph, according to an embodiment of the present disclosure.

FIG. 2B illustrates a simple example of a tree graph 250 for a static resource file version "sample.js, version 4." In this example tree graph 250, two user parameters are considered: language and display resolution. In this simplified scenario, there are three language options (U.S. English, French, and Italian), and two display resolution options (res_1 and res_2). The tree graph 250 creates three branches for the three language options, and then each of those language options are divided into two branches for the two display resolution options. This results in six user-adapted versions of the static resource file version sample.js, version 4. Each of the six user-adapted versions is assigned a unique file hash. For example, a first user-adapted version is associated with English and res_1, and is assigned a file hash 8a5qw. A second user-adapted version is associated with English and res_2, and is assigned a file hash w123n. A third user-adapted version is associated with French and res_1, and is assigned a file hash z89e4. A fourth user-adapted version is associated with French and res_2 and is assigned a file hash 4895b. A fifth user-adapted version is associated with Italian and res_1 and is assigned a file hash asfe1. A sixth user-adapted version is associated with Italian and res_2 and is assigned a file hash 480zy.

Returning to FIG. 2A, the tree graph module 204 can generate and/or maintain a tree graph for each version of each static resource file. For example, version 1 of static resource file sample.js would be associated with a first tree graph, and version 2 of static resource file sample.js would be associated with a second tree graph, and version 1 of a different static resource file template.js would be associated with a third tree graph, and so forth. A unique tree graph is required for each unique version of each static resource file because every time a static resource file is updated and changed, each user-adapted version of that static resource file would also be changed, and would require a unique file hash.

It can be appreciated that storing tree graph data for every tree graph for every version of every static resource file can consume a significant amount of data storage. As such, a complete set of tree graph data defining a set of tree graphs for a set of static resource file versions can be stored in a primary storage layer. A subset of the tree graph data can be stored in a local cache layer and/or an intermediate cache layer based on which versions of which static resource files have been requested by users (e.g., based on which static resource files have been provided to users in response to user web page requests). For example, as users submit web page requests associated with particular static resource file versions, corresponding tree graphs can be retrieved from the primary storage layer and stored in the local cache layer and/or the intermediate cache layer. Over time, as additional user requests are received, tree graphs in the local cache layer and/or the intermediate cache layer corresponding to older user requests can be replaced with tree graphs corresponding to newer user requests.

In certain embodiments, if certain static resource file versions are requested more frequently than others (i.e., are provided to users more frequently in response to user web page requests), tree graphs for those static resource file versions can be persistently stored in the local cache layer. In other words, tree graphs for the most frequently requested static resource file versions would not be replaced by tree graphs corresponding to more recent user requests. For example, the tree graph module 204 can maintain counters for each static resource file version (i.e., each version of each static resource file) to keep count of how many times each static resource file version has been requested by users (i.e., provided to users in response to user web page requests). Each static resource file version can be ranked based on the counters. In various embodiments, tree graphs for the top static resource file versions that satisfy a ranking threshold can be persistently stored in the local cache layer. For static resource file versions that do not satisfy the ranking threshold, tree graph data can be stored in the local cache layer when needed, and can be replaced within the local cache layer by tree graph data corresponding to more recent user requests as needed.

The tree hashing module 206 can be configured to generate and/or maintain a set of tree hashes for a plurality of tree graphs. As discussed above, each version of each static resource file can be associated with a tree graph. Each tree graph can be assigned a unique tree hash. As such, each version of each static resource file can be associated with a tree hash. If two versions of a static resource file have the same tree graph (e.g., if that static resource file did not change from one version to the next), then the two versions of the static resource file would have the same tree hash. However, if two versions of a static resource file have different tree graphs (e.g., the static resource file was changed from a first version to a second version), then they would also have different tree hashes. For example, consider a web page that is being updated from version 3 to version 4. The update from version 3 to version 4 results in a change to a first static resource file, alpha.js, but does not result in a change to a second static resource file, bravo.js. The tree hash for alpha.js version 3 would be different from the tree hash for alpha.js version 4, because alpha.js was changed/updated in the update. However, the tree hash for bravo.js version 3 would be the same as the tree hash for bravo.js version 4 because bravo.js was not changed in the update, and, therefore, the tree graph for bravo.js version 3 is the same as the tree graph for bravo.js version 4.

The tree hashing module 206 can maintain a tree hash data table. One or more copies of the tree hash data table can be stored in the local cache layer. For example, each web server of a set of web servers (e.g., all web servers associated with a web page) can locally store a copy of the tree hash data table. The tree hash data table can be used to map a static resource file identifier and a version number (together defining a static resource file version) to a tree hash, and to identify where the tree graph associated with the tree hash is stored. For example, the tree hashing module 206 can use the tree hash data table to determine whether a tree graph for a particular tree hash is stored in the local cache layer. If it is stored in the local cache layer, the tree graph does not need to be retrieved from the intermediate cache layer or the primary storage layer. If it is not stored in the local cache layer, the tree hashing module 206 can use the tree hash data table to determine where in the intermediate cache layer and/or the primary storage layer the corresponding tree graph is stored so that it can be retrieved and written to the local cache layer. In various embodiments, if a tree graph is stored in the intermediate cache layer, it can be retrieved and copied to the local cache layer. If the tree graph is not stored in the local cache layer or the intermediate cache layer, the tree graph can be retrieved from the primary storage layer and copied to the intermediate cache layer and the local cache layer.

The auxiliary hashing module 208 can be configured to generate and/or maintain one or more copies of an auxiliary data table in the local cache layer. For example, each web server of a set of web servers (e.g., all web servers associated with a web page) can locally store a copy of the auxiliary data table. The auxiliary data table can comprise a plurality of entries. Each entry in the auxiliary data table can be associated with a static resource file identifier and a version identifier. Each static resource file identifier/version identifier combination can identify a particular version of a particular static resource file (i.e., a static resource file version). Each entry in the auxiliary data table can comprise a set of tree hashes. A first tree hash of the set of tree hashes can be associated with the particular static resource file version associated with the entry. Any remaining tree hashes in the set of tree hashes may correspond to other static resource file versions that the particular static resource file version depends upon. For example, a static resource file version may depend on other static resource file versions to be executed properly. For example, a first static resource file version, apricot.js, version 2, may include one or more functions that are defined in other static resource file versions, e.g., blueberry.js, version 1 and carrot.js, version 2. As such, apricot.js, version 2 cannot be executed without blueberry.js, version 1 and carrot.js, version 2. As such, the entry in the auxiliary data table for apricot.js, version 2 can include three tree hashes: (1) the tree hash corresponding to the tree graph for apricot.js, version 2, (2) the tree hash corresponding to the tree graph for blueberry.js, version 1, and (3) the tree hash corresponding to the tree graph for carrot.js, version 2. In this way, when a user web page request is associated with a particular static resource file version, the auxiliary data table can be queried to identify the tree hash for every static resource file version that is needed to execute the requested static resource file version.

In certain embodiments, in order to maximize efficiency of the auxiliary data table, an auxhash can be generated for each entry in the auxiliary data table based on the set of tree hashes associated with each entry. By doing this, the auxhash would be unique for each combination of tree hashes. As such, if a particular static resource file did not change from one version to another, and, therefore, its dependencies also did not change, then the same set of tree hashes can be used and a new entry does not have to be generated in the auxiliary data table. In this way, the auxiliary data table de-duplicates data that is common to multiple revisions or versions of a static resource file. For example, an auxiliary data table may be generated as follows:

| auxhash | file | version/revision | data |
| --- | --- | --- | --- |
| abc123 | apricot.js | 1 | [th1, th2, th3] |
| def456 | apricot.js | 6 | [th6, th1, th3] |
| hij789 | apricot.js | 9 | [th2, th3, th9] |
| klm123 | blueberry.js | 1 | [th7, th10, th12] |
| nop345 | blueberry.js | 7 | [th14, th15, th16] |

This example auxiliary data table has entries for version 1, version 6, and version 9 of a static resource file apricot.js, and versions 1 and 7 of a static resource file blueberry.js. Version 1 of apricot.js is associated with tree hashes th1, th2, and th3. An auxiliary hash of apricot.js, version 1, "abc123," is generated based on the data associated with apricot.js, version 1, i.e., the set of tree hashes th1, th2, and th3. Versions 2-5 of apricot.js do not appear in the auxiliary data table. The auxiliary hashing module 208 may have generated an auxiliary hash for each of these versions of apricot.js, and found that the auxiliary hashes match an auxiliary hash already in the table, i.e., abc123. Therefore, a new entry was not created for these versions of apricot.js. As such, it can be understood that the set of tree hashes for versions 2-5 of apricot.js did not change, and those versions of apricot.js are also associated with tree hashes th1, th2, and th3. Version 6 of apricot.js is associated with tree hashes th6, th1, and th3. This new set of tree hashes are used to generate an auxiliary hash for apricot.js, version 6, i.e., def456. Again, based on their absence from the auxiliary data table, it can be understood that versions 7 and 8 of apricot.js are also associated with three hashes th6, th1, and th3. Version 9 of apricot.js is associated with tree hashes th2, th3, and th9, which results in an auxiliary hash of hij789. For the static resource file blueberry.js, the static resource file did not change from versions 1 through 6, so of those static resource file versions, only version 1 is stored in the auxiliary data table. Then, blueberry.js, version 7 resulted in a change to the static resource file, such that a new entry and a new auxhash was created in the auxiliary data table for blueberry.js, version 7.

Figure 3:
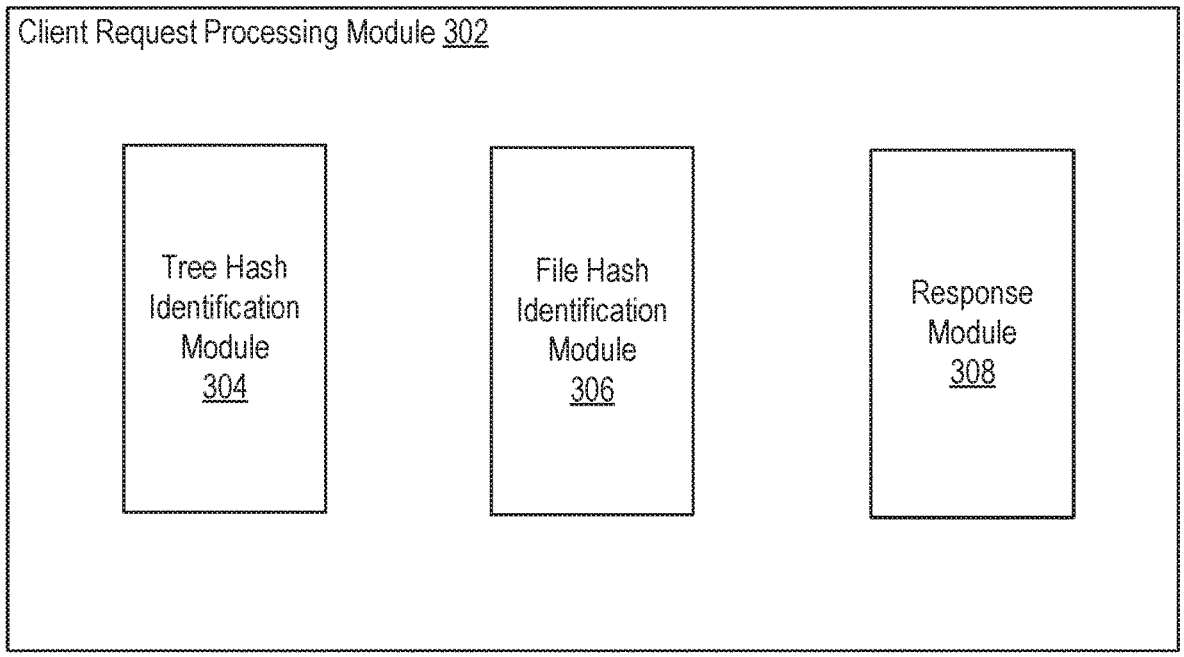
FIG. 3 illustrates an example client request processing module, according to an embodiment of the present disclosure.

FIG. 3 illustrates an example client request processing module 302 configured to generate a response to a client web page request, according to an embodiment of the present disclosure. In some embodiments, the client request processing module 106 of FIG. 1 can be implemented as the client request processing module 302. As shown in the example of FIG. 3, the client request processing module 302 can include a tree hash identification module 304, a file hash identification module 306, and a response module 308.

The tree hash identification module 304 can be configured to identify a set of tree hashes based on a client web page request. A client web page request from a requesting user can be associated with (e.g., contain information sufficient to determine) a static resource file identifier and a version identifier. In other words, at least one static resource file identifier and version identifier can be determined based on the client web page request. The static resource file identifier/version identifier combination can identify a particular version of a static resource file, i.e., a static resource file version. The tree hash identifier module 304 can query an auxiliary data table, such as the auxiliary data table maintained by the auxiliary hashing module 206, to identify a set of tree hashes associated with the static resource file version identified in the client web page request.

The file hash identification module 306 can receive a tree hash, and identify a file hash based on the tree hash and a set of user parameters associated with a requesting user. In various embodiments, the set of user parameters associated with a requesting user may be provided in a parameter vector that is transmitted with the client web page request. As discussed above, a tree hash can be associated with a tree graph. The file hash identification module 306 can query a tree hash data table, such as the tree hash data table maintained by the tree hashing module 206, to determine whether the tree graph associated with the received tree hash is stored in a local cache layer. For example, if a client web page request is received at a web server, the file hash identification module 306 can query the tree hash data table to determine whether the tree graph is stored in a local cache of the web server. If the tree hash data table indicates that the tree graph is stored locally, then the tree graph does not have to be retrieved from another storage layer. If the tree hash data table indicates that the tree graph is not stored locally, the file hash identification module 306 can retrieve the tree graph from either the intermediate cache layer or the primary storage layer and write it to the local cache layer.

The file hash identification module 306 can traverse the tree graph associated with the received tree hash to identify a file hash based on a set of user parameters associated with a requesting user. As discussed previously, a tree graph, such as the example tree graph of FIG. 2B, can comprise a plurality of user-adapted versions of a static resource file version. Each user-adapted version can be stored in an individual file, i.e., a user-adapted static resource file. The file hash identification module 306 can traverse the tree graph based on the set of user parameters to reach an end node in the tree graph. The end node can be associated with a particular user-adapted static resource file, and can comprise a file hash associated with the user-adapted static resource file. For example, in the example tree graph of FIG. 2B, the set of user parameters may indicate that the requesting user is a French user with a display resolution of res_2. The tree graph 250 can be traversed to first move to the "fr_FR" branch, and then to the "res_2" branch off of the "fr_FR" branch, which results in a file hash of "4895b."

The response module 308 can generate a response to a user web page request based on a set of file hashes. Once the file hash identification module 306 has identified a set of file hashes based on a set of tree hashes and a set of user parameters, the response module 308 can generate a response based on that set of file hashes. As discussed above, each file hash uniquely identifies a user-adapted static resource file. In certain embodiments, generating the response may comprise collecting a set of user-adapted static resource files based on the file hashes and transmitting the set of user-adapted static resource files to the requesting user. In another embodiment, the response may comprise determining a set of URLs associated with the set of file hashes and transmitting the set of URLs to the requesting user. The requesting user's computing device can utilize the set of URLs to download a set of user-adapted static resource files to be used in loading a web page.

Figure 4:
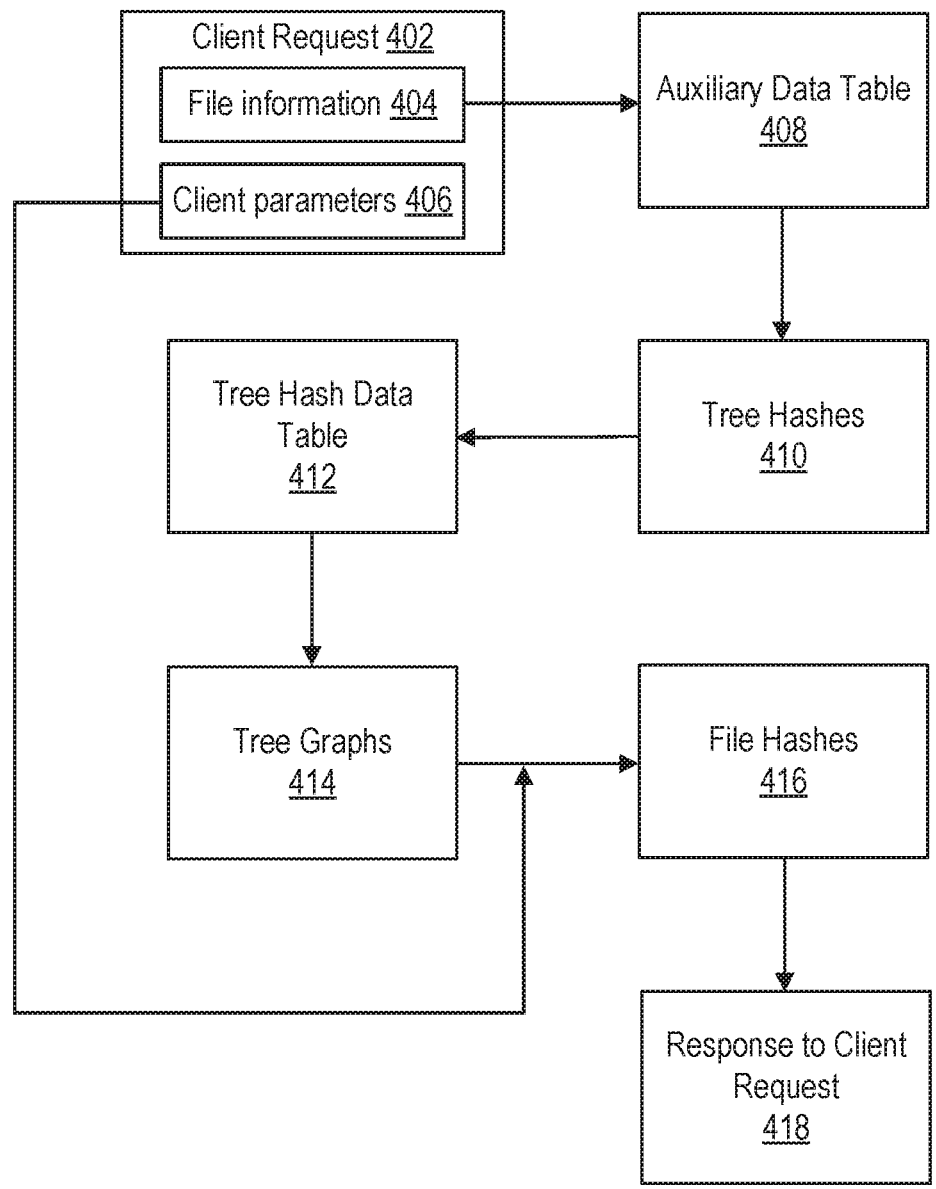
FIG. 4 illustrates an example functional block diagram associated with processing a client request, according to an embodiment of the present disclosure.

FIG. 4 illustrates an example functional block diagram 400 associated with processing a client web page request, according to an embodiment of the present disclosure. First, a client request 402 from a requesting user is received. The client request 402 can be associated with a set of file information 404 (e.g., a static resource file identifier and a version identifier), and a set of client parameters 406 associated with the requesting user. For example, the set of file information 404 may be determined based on a web page and version information identified by the client request 402. The file information 404 is used to query an auxiliary data table 408. The auxiliary data table 408 can be used to convert the file information 404 into an associated set of tree hashes 410. The set of tree hashes 410 are used to query a tree hash data table 412. Each tree hash of the set of tree hashes is associated with a tree graph. The tree hash data table 412 identifies where each tree graph is stored, such that a set of tree graphs 414 can be identified, and collected in a local cache layer. The client parameters 406 can be used to traverse the set of tree graphs 414 and identify a set of file hashes 416. A response 418 can be generated based on the set of file hashes 416 and transmitted back to the requesting user.

FIG. 5A illustrates an example method 500 associated with processing a client web page request, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can receive at a computing device a client request from a requesting user, the client request being associated with a web page. At block 504, the example method 500 can determine a static resource file identifier and a version identifier based on the client request. At block 506, the example method 500 can generate a response to the client request based on the static resource file identifier and the version identifier.

FIG. 5B illustrates an example method 550 associated with processing a client web page request, according to an embodiment of the present disclosure. It should be appreciated that there can be additional, fewer, or alternative steps performed in similar or alternative orders, or in parallel, within the scope of the various embodiments discussed herein unless otherwise stated.

At block 552, the example method 550 can receive at a computing device a client request from a requesting user, wherein the client request is associated with a static resource file identifier, a version identifier, and a set of user parameters associated with the requesting user. At block 554, the example method 550 can identify a set of tree hashes associated with the static resource file identifier and the version identifier. At block 556, the example method 550 can identify a set of tree graphs associated with the set of tree hashes. At block 558, the example method 550 can store the set of tree graphs in a local cache of the computing device, wherein at least one of the tree graphs of the set of tree graphs is retrieved from a remote database and copied to the local cache.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
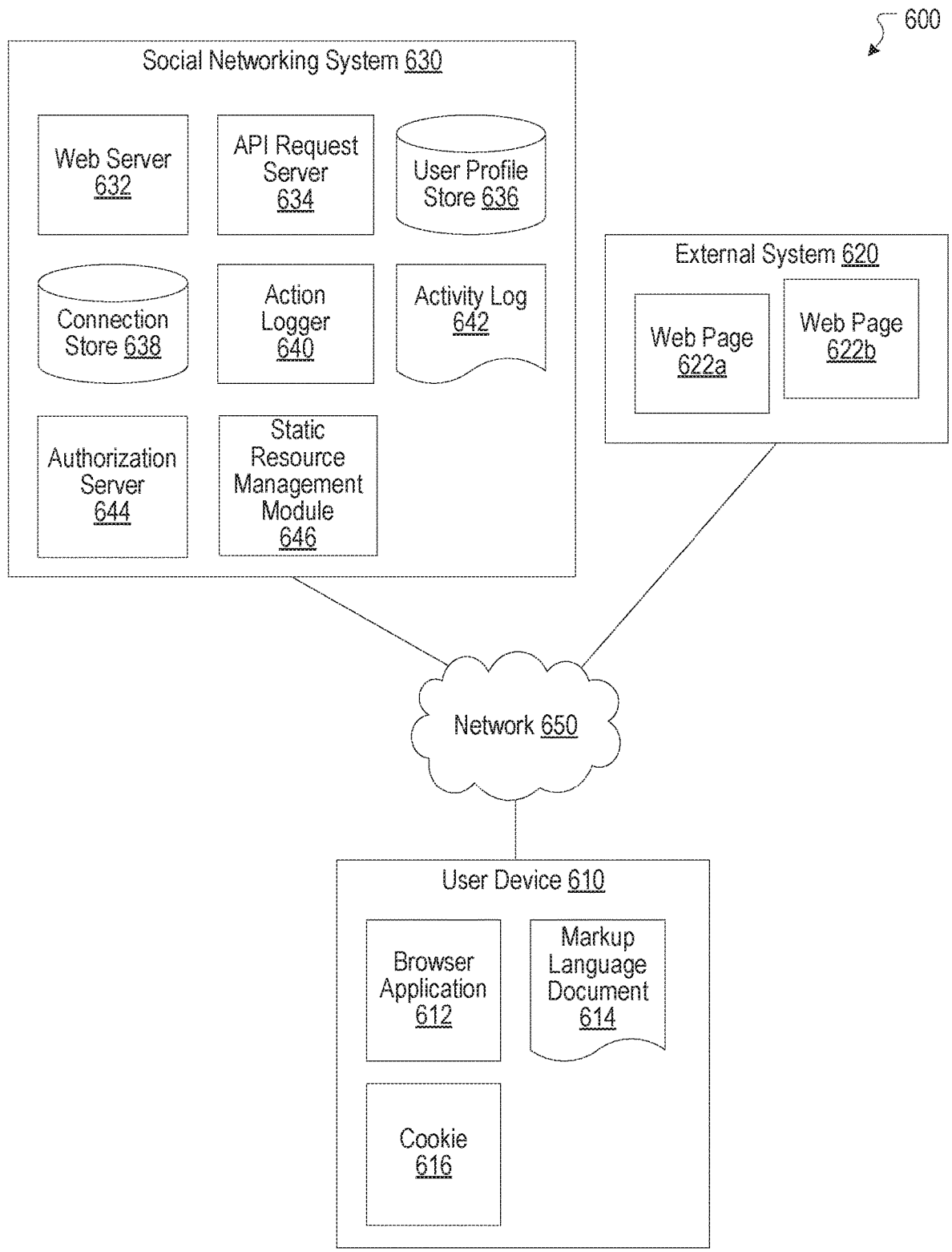
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a static resource management module 646. The static resource management module 646 can, for example, be implemented as the static resource management module 102, as discussed in more detail herein. As discussed previously, it should be appreciated that there can be many variations or other possibilities. For example, in some embodiments, one or more functionalities of the static resource management module 646 can be implemented in the user device 610.

Hardware Implementation

Figure 7:
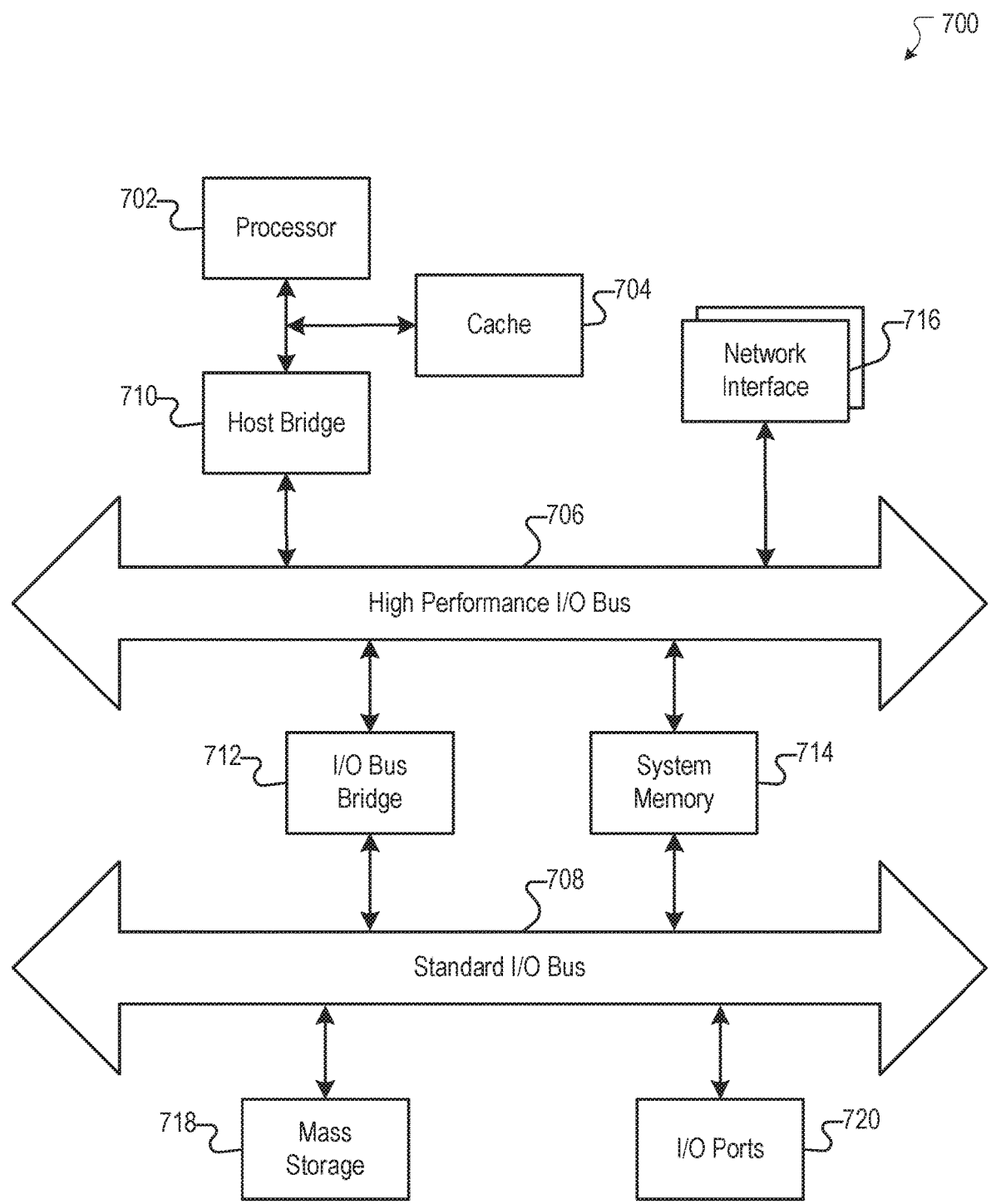
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computing system, a client request from a requesting user, wherein the client request is associated with a web page;
    determining, by the computing system, a static resource file identifier and a version identifier based on the client request;
    identifying, by the computing system, one or more tree hashes based on the static resource file identifier and the version identifier, wherein the one or more tree hashes identify one or more tree graphs;
    identifying, by the computing system, one or more file hashes based on the one or more tree graphs and user characteristics associated with the requesting user, wherein the one or more file hashes identify one or more user-adapted static resource files; and
    generating, by the computing system, a response to the client request based on the one or more file hashes.

2. The computer-implemented method of claim 1, wherein
    the static resource file identifier and the version identifier identify a first static resource file version, and
    the method further comprises
        identifying one or more additional static resource file versions upon which the first static resource file version depends.

3. The computer-implemented method of claim 2, wherein
    the identifying the one or more additional static resource file versions comprises querying an auxiliary data table, and further wherein
        the auxiliary data table comprises a plurality of entries,
        each entry of the plurality of entries is associated with a particular static resource file version, and
        each entry of the plurality of entries, associated with a particular static resource file version, identifies a set of additional static resource file versions upon which the particular static resource file version depends.

4. The computer-implemented method of claim 3, wherein each static resource file version of the set of additional static resource file versions is identified in the auxiliary table by a tree hash associated with the static resource file version.

5. The computer-implemented method of claim 3, wherein the auxiliary data table de-duplicates data that is common to multiple revisions of a static resource file.

6. The computer-implemented method of claim 1, further comprising storing the one or more tree graphs in a local cache of the computing system, wherein at least one of the tree graphs of the one or more tree graphs is retrieved from a remote database and copied to the local cache.

7. The computer-implemented method of claim 6, wherein the remote database stores a set of tree data defining a plurality of tree graphs, and the local cache stores a subset of the set of tree data.

8. The computer-implement method of claim 1, further comprising:
    traversing each tree graph of the one or more tree graphs based on the user characteristics associated with the requesting user to identify the one or more user-adapted static resource files.

9. The computer-implemented method of claim 8, wherein
    the response to the client request comprises a set of URLs, and
    each URL of the set of URLs specifies a network address from which a user-adapted static resource file of the one or more user-adapted static resource files can be downloaded.

10. A system comprising:
    at least one processor; and
    a memory storing instructions that, when executed by the at least one processor, cause the system to perform a method comprising:
        receiving a client request from a requesting user, wherein the client request is associated with a web page;
        determining a static resource file identifier and a version identifier based on the client request;

identifying one or more tree hashes based on the static resource file identifier and the version identifier, wherein the one or more tree hashes identify one or more tree graphs;

identifying one or more file hashes based on the one or more tree graphs and user characteristics associated with the requesting user, wherein the one or more file hashes identify one or more user-adapted static resource files; and generating a response to the client request based on the one or more file hashes.

11. The system of claim 10, wherein the static resource file identifier and the version identifier identify a first static resource file version, and the instructions, when executed by the at least one processor, further cause the system to perform:

identifying one or more additional static resource file versions upon which the first static resource file version depends.

12. The system of claim 11, wherein the identifying the one or more additional static resource file versions comprises querying an auxiliary data table, and further wherein the auxiliary data table comprises a plurality of entries, each entry of the plurality of entries is associated with a particular static resource file version, and each entry of the plurality of entries, associated with a particular static resource file version, identifies a set of additional static resource file versions upon which the particular static resource file version depends.

13. The system of claim 12, wherein each static resource file version of the set of additional static resource file versions is identified in the auxiliary table by a tree hash associated with the static resource file version.

14. The system of claim 12, wherein the auxiliary data table de-duplicates data that is common to multiple revisions of a static resource file.

15. A non-transitory computer-readable storage medium including instructions that, when executed by at least one processor of a computing system, cause the computing system to perform a method comprising:

receiving a client request from a requesting user, wherein the client request is associated with a web page;

determining a static resource file identifier and a version identifier based on the client request;

identifying one or more tree hashes based on the static resource file identifier and the version identifier, wherein the one or more tree hashes identify one or more tree graphs;

identifying one or more file hashes based on the one or more tree graphs and user characteristics associated with the requesting user, wherein the one or more file hashes identify one or more user-adapted static resource files; and generating a response to the client request based on the one or more file hashes.

16. The non-transitory computer-readable storage medium of claim 15, wherein the static resource file identifier and the version identifier identify a first static resource file version, and the instructions, when executed by the at least one processor, further cause the computing system to perform:

identifying one or more additional static resource file versions upon which the first static resource file version depends.

17. The non-transitory computer-readable storage medium of claim 16, wherein the identifying the one or more additional static resource file versions comprises querying an auxiliary data table, and further wherein the auxiliary data table comprises a plurality of entries, each entry of the plurality of entries is associated with a particular static resource file version, and each entry of the plurality of entries, associated with a particular static resource file version, identifies a set of additional static resource file versions upon which the particular static resource file version depends.

18. The non-transitory computer-readable storage medium of claim 17, wherein each static resource file version of the set of additional static resource file versions is identified in the auxiliary table by a tree hash associated with the static resource file version.

19. The non-transitory computer-readable storage medium of claim 17, wherein the auxiliary data table de-duplicates data that is common to multiple revisions of a static resource file.

* * * * *